Patented Aug. 11, 1936

2,050,345

UNITED STATES PATENT OFFICE 2,050,345

PROCESS OF REFINING PETROLEUM OILS

Leo Liberthson, New York, N. Y., assignor to L. Sonneborn Sons, Inc., a corporation of Delaware No Drawing. Application July 12, 1933, Serial No. 680,080

15 Claims. (Cl. 196—40)

The usual treatment of lubricating oil distillates derived from petroleum involves the application of several percent of concentrated sulphuric acid. This reacts with the oil, producing a black sludge containing unreacted sulphuric acid plus organic matter which consists largely of asphalts and asphaltenes of substantially neutral character. With certain oils however, it is necessary to obtain a more vigorous treating action than would result from the application of concentrated sulphuric acid, and in such case the oil is treated with fuming sulphuric acid. The amount of fuming sulphuric acid by volume in relation to the volume of oil originally treated may range from 1 or 2 up to about 15 or 20% for example, although it normally ranges from about 2 to about 8%. The concentration of $SO_3$ in the fuming acid may likewise range over considerable limits, although 20% fuming acid, viz, acid containing this percentage of $SO_3$, is frequently employed. Where fuming sulphuric acid is used, a considerable degree of sulphonation is obtained; the organic content of the sludge will, in this case, be found to contain predominantly water soluble sulphonic acids, and there are simultaneously produced other types of sulphonic acids which are predominantly oil soluble and which may be found in the oil to the extent of a few percent. The temperature of application of the acid will be regulated in the manner well known in the art to produce the desired sulphonation reaction, and, in general, temperatures not exceeding 140° F. are preferred. The organic acids in the sludge may compose from 25 to 75% of the total sludge, and while limitedly soluble, if at all, in hydrocarbon oils, are highly water soluble. The free acids in aqueous solution are dark green in color and for this reason are generally referred to as "green petroleum sulphonic acids". The acids left in solution in the oil impart a reddish color to the oil containing the same and for this reason are generally referred to as "mahogany petroleum sulphonic acids". The oil may also carry variable amounts of the green petroleum sulphonic acids as finely dispersed or mechanically suspended particles. For many uses to which lubricating oil is applied where demulsibility is essential, the oil soluble sulphonic acids, either free or neutralized, are objectionable as they tend to render the oil easily emulsifiable, and for this reason it is frequently important to remove them as completely as possible. I have found that these acids are soluble in the dichloroethyl ether and may be efficiently and easily removed by admixing dichloroethyl ether with the oil. In the ordinary method of removal, these acids are first converted into salts by neutralization, but in my process this neutralization is not essential and the free acids are extracted as such. This should of course be done after the oil has been separated from the sludge formed on reaction with the sulphuric acid. The dichloroethyl ether is soluble in the oil to the extent of several percent, and it is therefore necessary to add the dichloroethyl ether in an amount which exceeds its solubility in the oil, thereby yielding a two layer system. The dichloroethyl ether furthermore has considerably higher specific gravity than the oil and settles to the bottom to form a second liquid phase. The second liquid phase may, for example, range from 5 to 25% by volume of the oil from which is separates. In any case, it should not be necessary to use an amount of dichloroethyl ether producing a second liquid phase in excess of 50% by volume of the oil to obtain complete removal of the sulphonic acids and sharp separation into two layers. These limits are merely intended as illustrations and not in any way as restrictions on the scope of the invention. As concerns the residual green sulphonic acids dispersed in the oil, I have found that they are not soluble in the dichloroethyl ether, but that they are coagulated by contact with it and are precipitated as completely discrete and easily removable sludge, which forms an intermediate layer between the oil and the dichloroethyl ether, layers. The oil soluble sulphonic acids, on the other hand, will be found to have passed almost exclusively into the second liquid phase and to have been almost completely removed from the oil. The second liquid phase is then removed from contact with the oil and may if desired be treated to recover the organic acids in usable form. One method of accomplishing this purpose is to neutralize the acids present with an aqueous solution of caustic soda or potash and then remove the dichloroethyl ether by steam distillation. A residue of soaps, with some oil and with the water condensed during distillation will be left in the still at the end of the distillation. The residue may, if desired, be further purified by the addition of alcohol of not more than 3 carbon atoms to bring the alcohol water ratio to about 1:1, whereupon the oil will separate at the top and any inorganic salts, such as sodium sulphate, will be deposited at the bottom leaving the purified soaps in the alcohol-water solution. The solution may then be concentrated to any desired point and the alcohol recovered. Although one application of dichloroethyl ether is ordinarily sufficient, subsequent treatments may be similarly applied if desired. At the expiration of the treatment or treatments, the oil is subjected to distillation to remove the few percent of dichloroethyl ether dissolved therein, which will, of course, be suitably recovered, as for example by condensation. The oil may be marketed immediately, or may, if desired, be finished by a further treatment with adsorbent material, as for example by contacting it with adsorbent clay. The clay treatment may be carried out in any suitable manner, as for example by running the oil through a porous bed of fuller's earth, or the like, in a percolation type of filter, or, alternatively, by admixing the oil with fine adsorbent clay and thereafter settling or filtering the same.

One advantageous application of my process is in the manufacture of oils which must be more highly refined, such as for example transformer oils. In this case, it is necessary to remove the major part of the substances which are reactable with fuming acid, in order to meet the exacting specifications. While this could be accomplished by a single treatment with fuming sulphuric acid in sufficient quantity, it has been found that greater efficiency is obtained by the successive application of a number of separate batches. The amount of acid applied in each case may range from 3 to 20% by volume of the original quantity of oil treated, although from 5 to 8% is the usual practice. After agitating the oil and a batch of acid together, the mixture is permitted to settle, whereupon the sludge separates as a lower layer and is withdrawn. The next batch of acid may then be applied. After the last batch of acid has been applied, the mixture is settled, and the sludge is withdrawn. The oil will be found to contain in solution from 1 or more up to several percent of the mahogany sulphonic acids, and a small amount, in mechanical dispersion, of green sulphonic acids. The oil is then treated, without neutralization of the organic acids, with dichloroethyl ether in amount sufficient to produce a second liquid phase. The second liquid phase is withdrawn and carries with it all of the organic acids theretofore dissolved in the oil layer. The organic acids, which are insoluble in the oil layer and which are carried into it through prior contact with the acid sludge and remain mechanically dispersed and suspended in it, are at the same time wetted out, coagulated and precipitated by the dichloroethyl ether to form an intermediate layer which should also be withdrawn. Successive treatments of dichloroethyl ether may, of course, be applied if desired, although one is ordinarily sufficient, and at the expiration of the treatments the oil may be freed of the several percent of dichloroethyl ether dissolved therein and marketed either directly or after clay filtration.

The preferred application of my process is in the manufacture of white or substantially white mineral oils. In making such oils, it is necessary to remove substantially all of the components soluble in fuming sulphuric acid. For this purpose, a lubricating oil distillate is subjected to repeated treatments with batches of fuming sulphuric acid, in the manner hereinbefore described, for treatment of transformer oils, preferably with settling and removal of sludge after each application of acid. After the major part of the substances reactable with fuming sulphuric acid have been treated out and the sludge removed, it is ordinarily desirable to remove from the oil the sulphonic acid dissolved therein. This is advisable both for the economy and efficiency of the subsequent treatments and for the recovery of these acids, inasmuch as they have a substantial by-product value. This removal may, of course, be accomplished by treatment with dichloroethyl ether in the manner hereinbefore described. The organic acids may then be converted into the corresponding sodium or potassium soaps and recovered in the manner hereinbefore described.

The remainder of hydrocarbon oil is therafter subjected to further treatments with fuming sulphuric acid, in order to remove substantially all of the constituents reactable with fuming acid. 3 or 4 additional treatments may be necessary for this purpose. When this point is reached, it is again necessary to remove the sulphonic acids which are formed by the sulphuric acid and which are left in the oil. The extraction has been heretofore accomplished by neutralization and by the alcohol-water process of extraction. I have found, however, that this method of extraction, as ordinarily carried out, appears to leave in the oil minute traces of oil soluble organic material which impairs the value of the finished oil. This impairment may be apparent through the aquisition by the finished oil or objectionable odor, color and taste on exposure to ultra violet light or to natural light for prolonged periods. While it might be possible to remove these traces by repeated filtration through a large quantity of clay or equivalent adsorbent medium, this would add considerably to the expense, would be relatively inefficient, and would entail large losses of oil.

I have found, however, that by the use of one or more treatments with dichloroethyl ether and without neutralization of the organic acids, they may be substantially completely removed from the treated oil. After settling and separation of the dichloroethyl ether phase carrying the organic acids dissolved therein, the remainder of hydrocarbon oil is distilled for the removal of the several percent of dichloroethyl ether contained therein, and the oil may then be immediately filtered through fuller's earth or similar adsorbent clay. The finished oil will be superior to that ordinarily produced from a corresponding distillate with the same amount of fuming sulphuric acid, and in particular will be markedly superior in its resistance to the effect of prolonged exposure to light and/or to ultra voilet light.

The foregoing description is for purposes of illustration and not of limitation, and it is therefore my intention that the invention be limited only by the appended claims or their equivalents, wherein I have endeavored to claim broadly all inherent novelty.

I claim:

1. Process of refining petroleum oils, which comprises mixing a petroleum lubricating oil with fuming sulphuric acid under sulphonating conditions adapted to form a sludge, and a remainder of hydrocarbon oil containing dissolved therein mahogany sulphonic acids and dispersed therein green sulphonic acids, separating said hydrocarbon oil from said sludge, thereafter admixing with said hydrocarbon oil dichloroethyl ether in excess of the amount which will dissolve therein, simultaneously thereby coagulating and precipitating the dispersed green sulphonic acids and forming a second liquid phase consisting predominantly of dichloroethyl ether and carrying in solution the mahogany sulphonic acids which were dissolved in the said hydrocarbon oil, and thereafter separating said hydrocarbon oil from said second liquid phase.

2. Process of refining petroleum oils, which comprises mixing a petroleum lubricating oil with fuming sulphuric acid under sulphonating conditions adapted to form a sludge, and a remainder of hydrocarbon oil containing dissolved therein mahogany sulphonic acids and dispersed therein green sulphonic acids, separating said hydrocarbon oil from said sludge, thereafter admixing with said hydrocarbon oil dichloroethyl ether in excess of the amount which will dissolve therein, simultaneously thereby coagulating and precipitating the dispersed green sulphonic acids and forming a second liquid phase consisting predominantly of dichloroethyl ether and carrying in solution the mahogany sulphonic acids which were dissolved in the said hydrocarbon oil, thereafter separating said hydrocarbon oil from said second liquid phase, thereafter distilling away from said separated hydrocarbon oil the dichloroethyl ether contained therein, and thereafter contacting said hydrocarbon oil with adsorbent clay.

3. Process of refining petroleum oils, which comprises mixing a petroleum lubricating oil with fuming sulphuric acid in quantity sufficient to remove therefrom the major part of the constituents reactable with fuming sulphuric acid under sulphonating conditions adapted to form a sludge, and a remainder of hydrocarbon oil containing dissolved therein mahogany sulphonic acids and dispersed therein green sulphonic acids, separating said hydrocarbon oil and dissolved sulphonic acids from said sludge, thereafter admixing with said hydrocarbon oil dichloroethyl ether in excess of the amount which will dissolve therein, simultaneously thereby coagulating and precipitating the dispersed green sulphonic acids and forming a second liquid phase consisting predominantly of dichloroethyl ether and carrying in solution the mahogany sulphonic acids theretofore dissolved in said hydrocarbon oil, and thereafter separating said hydrocarbon oil from said second liquid phase.

4. Process of refining petroleum oils, which comprises mixing a petroleum lubricating oil with fuming sulphuric acid in quantity sufficient to remove therefrom the major part of the constituents reactable with fuming sulphuric acid under sulphonating conditions adapted to form a sludge, and a remainder of hydrocarbon oil containing dissolved therein mahogany sulphonic acids and dispersed therein green sulphonic acids, separating said hydrocarbon oil and dissolved sulphonic acids from said sludge, thereafter admixing with said hydrocarbon oil dichloroethyl ether in excess of the amount which will dissolve therein, simultaneously thereby coagulating and precipitating the dispersed green sulphonic acids and forming a second liquid phase predominantly of dichloroethyl ether and carrying in solution the mahogany sulphonic acids theretofore dissolved in said hydrocarbon oil, thereafter separating said hydrocarbon oil from said second liquid phase, thereafter distilling away from said hydrocarbon oil the dichloroethyl ether contained therein, and thereafter contacting said hydrocarbon oil with adsorbent clay.

5. Process of refining petroleum oils, which comprises removing from a petroleum lubricating oil the major part of the constituents of said petroleum lubricating oil which are reactable with fuming sulphuric acid by repeatedly contacting such petroleum lubricating oil with successive batches of fuming sulphuric acid under sulphonating conditions adapted to form sludges, and a remainder of hydrocarbon oil containing dissolved therein mahogany sulphonic acids and dispersed therein green sulphonic acids, separating said hydrocarbon oil from said sludges, thereafter admixing with said hydrocarbon oil dichloroethyl ether in excess of the amount which will dissolve therein, simultaneously thereby coagulating and precipitating the dispersed green sulphonic acids and forming a second liquid phase consisting predominantly of dichloroethyl ether and carrying in solution the mahogany sulphonic acids theretofore dissolved in said hydrocarbon oil, and thereafter separating said hydrocarbon oil from said second liquid phase.

6. Process of refining petroleum oils, which comprises removing from a petroleum lubricating oil the major part of the constituents of said petroleum lubricating oil which are reactable with fuming sulphuric acid by repeatedly contacting such petroleum lubricating oil with successive batches of fuming sulphuric acid under sulphonating conditions adapted to form sludges, and a remainder of hydrocarbon oil containing dissolved therein mahogany sulphonic acids and dispersed therein green sulphonic acids, separating said hydrocarbon oil from said sludges, thereafter admixing with said hydrocarbon oil dichloroethyl ether in excess of the amount which will dissolve therein, simultaneously thereby coagulating and precipitating the dispersed green sulphonic acids and forming a second liquid phase consisting predominantly of dichloroethyl ether and carrying in solution the mahogany sulphonic acids theretofore dissolved in said hydrocarbon oil, thereafter separating said hydrocarbon oil from said second liquid phase, thereafter distilling away from said hydrocarbon oil the dichloroethyl ether contained therein, and thereafter contacting said hydrocarbon oil with adsorbent clay.

7. Process of refining petroleum oils, which comprises mixing a petroleum lubricating oil with fuming sulphuric acid in quantity sufficient to remove therefrom substantally all of the constituents reactable with fuming sulphuric acid under temperature sulphonating conditions adapted to form a sludge, and a remainder of hydrocarbon oil containing dissolved therein mahogany sulphonic acids and dispersed therein green sulphonic acids, separating said hydrocarbon oil and dissolved sulphonic acids from said sludge, thereafter admixing with said hydrocarbon oil dichloroethyl ether in excess of the amount which will dissolve therein, simultaneously thereby coagulating and precipitating the dispersed green sulphonic acids and forming a second liquid phase consisting predominantly of dichloroethyl ether and carrying in solution the mahogany sulphonic acids theretofore dissolved in said hydrocarbon oil, and thereafter separating said hydrocarbon oil from said second liquid phase.

8. Process of refining petroleum oils, which comprises mixing a petroleum lubricating oil with fuming sulphuric acid in quantity sufficient to remove therefrom substantially all of the constituents reactable with fuming sulphuric acid under sulphonating conditions adapted to form a sludge, and a remainder of hydrocarbon oil containing dissolved therein mahogany sulphonic acids and dispersed therein green sulphonic acids, separating said hydrocarbon oil and dissolved sulphonic acids from said sludge, thereafter admixing with said hydrocarbon oil dichloroethyl ether in excess of the amount which will dissolve therein, simultaneously thereby coagulating and precipitating the dispersed green sulphonic acids and forming a second liquid phase consisting predominantly of dichloroethyl ether and carrying in solution the mahogany sulphonic acids theretofore dissolved in said hydrocarbon oil, thereafter separating said hydrocarbon oil from said second liquid phase, thereafter distilling away from said hydrocarbon oil the dichloroethyl ether contained therein, and thereafter contacting said hydrocarbon oil with adsorbent clay.

9. Process of refining petroleum oils, which comprises removing from a petroleum lubricating oil substantially all of the constituents of said petroleum lubricating oil which are reactable with fuming sulphuric acid by repeatedly contacting such petroleum lubricating oil with successive batches of fuming sulphuric acid under sulphonating conditions adapted to form sludges, and a remainder of hydrocarbon oil containing dissolved therein mahogany sulphonic acids and dispersed therein green sulphonic acids, separating said hydrocarbon oil from said sludges, thereafter admixing with said hydrocarbon oil dichloroethyl ether in excess of the amount which will dissolve therein, simultaneously thereby coagulating and precipitating the dispersed green sulphonic acids and forming a second liquid phase consisting predominantly of dichloroethyl ether and carrying in solution the mahogany sulphonic acids theretofore dissolved in said hydrocarbon oil, and thereafter separating said hydrocarbon oil from said second liquid phase.

10. Process of refining petroleum oils, which comprises removing from a petroleum lubricating oil substantially all of the constituents of said petroleum lubricating oil which are reactable with fuming sulphuric acid by repeatedly contacting such petroleum lubricating oil with successive batches of fuming sulphuric acid under sulphonating conditions adapted to form sludges, and a remainder of hydrocarbon oil containing dissolved therein mahogany sulphonic acids and dispersed therein green sulphonic acids, separating said hydrocarbon oil from said sludges, thereafter admixing with said hydrocarbon oil dichloroethyl ethyl in excess of the amount which will dissolve therein, simultaneously thereby coagulating and precipitating the green sulphonic acids and forming a second liquid phase consisting predominantly of dichloroethyl ether and carrying in solution the mahogany sulphonic acids theretofore dissolved in said hydrocarbon oil, thereafter separating said hydrocarbon oil from said second liquid phase, thereafter distilling away from said hydrocarbon oil the dichloroethyl ether contained therein, and thereafter contacting said hydrocarbon oil with adsorbent clay.

11. Process of refining petroleum oils which comprises, mixing a petroleum lubricating oil with fuming sulphuric acid under sulphonating conditions adapted to form a sludge, and a remainder of hydrocarbon oil containing petroleum sulphonic acids such as green sulphonic and mahogany sulphonic acids, separating said hydrocarbon oil and petroleum sulphonic acids contained therein from said sludge, thereafter admixing with said hydrocarbon oil dichloroethyl ether in excess of the amount which will dissolve therein, thereby forming a second liquid phase substantially free from green sulphonic acids and consisting predominantly of dichloroethyl ether carrying in solution the mahogany sulphonic acids theretofore contained in the said hydrocarbon oil, and thereafter separating said hydrocarbon oil from said second liquid phase.

12. Process of refining petroleum oils, which comprises mixing a petroleum lubricating oil with fuming sulphuric acid in quantity sufficient to remove therefrom the major part of the constituents reactable with fuming sulphuric acid under sulphonating conditions adapted to form a sludge, and a remainder of hydrocarbon oil containing petroleum sulphonic acids such as green sulphonic and mahogany sulphonic acids, separating said hydrocarbon oil and petroleum sulphonic acids, contained therein, from said sludge, thereafter admixing with said hydrocarbon oil dichloroethyl ether in excess of the amount which will dissolve therein, thereby forming a second liquid phase substantially free from green sulphonic acids and consisting predominantly of dichloroethyl ether containing in solution the petroleum mahogany sulphonic acids theretofore contained in said hydrocarbon oil and thereafter separating said oil from said second liquid phase.

13. Process of refining petroleum oils which comprises removing from a petroleum lubricating oil the major part of the constituents of said petroleum lubricating oil which are reactable with fuming sulphuric acid by repeatedly contacting such petroleum lubricating oil with successive batches of fuming sulphuric acid under sulphonating conditions adapted to form sludges, and a remainder of hydrocarbon oil containing petroleum sulphonic acids such as green sulphonic and mahogany sulphonic acids, separating said hydrocarbon oil and petroleum sulphonic acids contained therein from said sludges, thereafter admixing with said hydrocarbon oil dichloroethyl ether in excess of the amount which will dissolve therein, thereby forming a second liquid phase substantially free from green sulphonic acids and consisting predominantly of dichloroethyl ether containing in solution the mahogany sulphonic acids theretofore contained in said hydrocarbon oil and thereafter separating said hydrocarbon oil from said second liquid phase.

14. Process of refining petroleum oils, which comprises mixing a petroleum lubricating oil with fuming sulphuric acid in quantity sufficient to remove therefrom substantially all of the constituents reactable with fuming sulphuric acid under sulphonating conditions adapted to form a sludge and a remainder of hydrocarbon oil containing petroleum sulphonic acids such as green sulphonic and mahogany sulphonic acids, separating said hydrocarbon oil and petroleum sulphonic acids contained therein from said sludge thereafter admixing with said hydrocarbon oil dichloroethyl ether in excess of the amount which will dissolve therein, thereby forming a second liquid phase substantially free from green sulphonic acids and consisting predominantly of dichloroethyl ether containing in solution the mahogany petroleum sulphonic acids theretofore contained in said hydrocarbon oil and thereafter separating said hydrocarbon oil from said second liquid phase.

15. Process of refining petroleum oils, which comprises removing from a petroleum lubricating oil substantially all of the constituents of said petroleum lubricating oil which are reactable with fuming sulphuric acid by repeatedly contacting such petroleum lubricating oil with successive batches of fuming sulphuric acid under sulphonating conditions adapted to form sludges, and a remainder of hydrocarbon oil containing petroleum sulphonic acids such as green sulphonic and mahogany sulphonic acids, separating said hydrocarbon oil and petroleum sulphonic acids contained therein from said sludges, thereafter admixing with said hydrocarbon oil dichloroethyl ether in excess of the amount which will dissolve therein, thereby forming a second liquid phase substantially free from green sulphonic acids and consisting predominantly of dichloroethyl ether containing in solution the mahogany sulphonic acids theretofore contained in said hydrocarbon oil, and thereafter separating said hydrocarbon oil from said second liquid phase.

LEO LIBERTHSON.